(12) United States Patent
Du et al.

(10) Patent No.: US 12,111,695 B2
(45) Date of Patent: Oct. 8, 2024

(54) ELECTRONIC DEVICE AND CONTROL METHOD THEREOF

(71) Applicant: VIVO MOBILE COMMUNICATION CO., LTD., Guangdong (CN)

(72) Inventors: Xianhe Du, Guangdong (CN); Mingjian Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 208 days.

(21) Appl. No.: 17/736,225

(22) Filed: May 4, 2022

(65) Prior Publication Data

US 2022/0261041 A1 Aug. 18, 2022

Related U.S. Application Data

(63) Continuation of application No. PCT/CN2020/127046, filed on Nov. 6, 2020.

(30) Foreign Application Priority Data

Nov. 7, 2019 (CN) .......................... 201911083554.1

(51) Int. Cl.
  *G06F 1/16* (2006.01)
  *H04M 1/02* (2006.01)
(52) U.S. Cl.
  CPC .......... *G06F 1/1652* (2013.01); *G06F 1/1626* (2013.01); *H04M 1/0268* (2013.01)

(58) Field of Classification Search
  CPC ... G06F 1/1652; G06F 1/1626; H04M 1/0268
  USPC .......................................................... 361/807
  See application file for complete search history.

(56) References Cited

U.S. PATENT DOCUMENTS

| | | |
|---|---|---|
| 2008/0018631 A1 | 1/2008 | Hioki et al. |
| 2012/0307423 A1* | 12/2012 | Bohn ................... H04M 1/0216 361/679.01 |
| 2015/0131222 A1* | 5/2015 | Kauhaniemi ......... G06F 1/1681 16/225 |
| 2015/0185761 A1 | 7/2015 | Song et al. |
| 2015/0277854 A1 | 10/2015 | Zhang |
| 2015/0325804 A1 | 11/2015 | Lindblad |
| 2017/0285688 A1 | 10/2017 | Sun |
| 2017/0359915 A1* | 12/2017 | Yang ..................... H05K 5/0017 |
| 2018/0004252 A1 | 1/2018 | Ahrens et al. |
| 2018/0020556 A1* | 1/2018 | Seo ........................ G06F 1/1641 |

(Continued)

FOREIGN PATENT DOCUMENTS

| | | |
|---|---|---|
| CN | 104766539 A | 7/2015 |
| CN | 104955285 A | 9/2015 |

(Continued)

*Primary Examiner* — Zhengfu J Feng
(74) *Attorney, Agent, or Firm* — Price Heneveld LLP

(57) ABSTRACT

An electronic device and a control method thereof are disclosed. The electronic device includes a screen, where the screen includes a bendable flexible screen portion; and a support assembly, where the support assembly is disposed on a back side of the flexible screen portion and configured to support the flexible screen portion, and the support assembly is switchable between a first state and a second state. In a case that the support assembly is in the first state, the flexible screen portion is curved; and in a case that the support assembly is in the second state, the flexible screen portion is flat.

13 Claims, 5 Drawing Sheets

(56) References Cited

U.S. PATENT DOCUMENTS

2019/0315109 A1    10/2019  Zhang et al.
2021/0174709 A1*   6/2021   Xiang .................... H05K 1/028

FOREIGN PATENT DOCUMENTS

| | | |
|---|---|---|
| CN | 104714699 A | 6/2016 |
| CN | 106527728 A | 3/2017 |
| CN | 106847099 A | 6/2017 |
| CN | 107622734 A | 1/2018 |
| CN | 107657895 A | 2/2018 |
| CN | 208734715 U | 1/2019 |
| CN | 110928365 A | 3/2020 |
| EP | 2674807 A1 | 12/2013 |
| EP | 3242281 A1 | 12/2014 |
| EP | 2892045 A1 | 7/2015 |
| EP | 3270259 A1 | 1/2018 |
| JP | 2015228022 A | 12/2015 |
| JP | 2018506327 A | 3/2018 |
| KR | 20120082807 A | 7/2012 |
| KR | 20170098902 A | 8/2017 |
| WO | 2018196295 A1 | 11/2018 |
| WO | 2019101328 A1 | 5/2019 |

* cited by examiner

ELECTRONIC DEVICE AND CONTROL METHOD THEREOF

CROSS-REFERENCE TO RELATED APPLICATIONS

This application is a continuation application of International Application No. PCT/CN2020/127046 filed on Nov. 6, 2020, which claims priority to Chinese Patent Application No. 201911083554.1, filed in China on Nov. 7, 2019, which are incorporated herein by reference in their entireties.

TECHNICAL FIELD

The present disclosure relates to the field of electronic technologies, and in particular, to an electronic device and a control method thereof.

BACKGROUND

As the design of electronic devices with screens such as smart phones and tablet computers are constantly improved, people's aesthetics for such electronic devices are also changing. To adapt to people's aesthetic demands, new screen designs, such as curved screens and waterfall screens, are constantly proposed for electronic devices to improve display effects of their screens.

Although curved screens, including waterfall screens, can provide users with a good visual display and a good hand feel, when users use electronic devices with curved screens such as waterfall screens, what is displayed on the curved part of the screen is often not directly accessible for users due to the curvature of the screen and the propagation of light along a straight line. In full-screen operation scenarios, for example, in playing games or watching full-screen movies on curved screens, particularly, the curved structure often results in users not seeing screen information at the edge of the screen or having edge reflection problems. In addition, in the full-screen operation scenario, some operations need to be triggered by the curved part of the screen, which leads to inconvenient function triggering or easily leads to mistouch.

SUMMARY

The present disclosure provides an electronic device and a control method thereof, so as to resolve the problems of electronic devices with a curved structure in the prior art, such as inconvenient viewing of displayed content, reflection of light, mistouch on functions, or inconvenient triggering on curved portions of a screen.

In order to resolve the foregoing technical problems, the present disclosure is implemented as follows:

According to a first aspect, an embodiment of the present disclosure provides an electronic device, including:
  a screen, where the screen includes a bendable flexible screen portion; and
  a support assembly, where the support assembly is disposed on a back side of the flexible screen portion and is configured to support the flexible screen portion, and the support assembly is switchable between a first state and a second state; where
  in a case that the support assembly is in the first state, the flexible screen portion is curved; and
  in a case that the support assembly is in the second state, the flexible screen portion is flat.

According to a second aspect, an embodiment of the present disclosure provides an electronic device control method applied to the electronic device provided in the first aspect. The method includes:
  receiving a screen adjustment instruction; and
  controlling, according to the screen adjustment instruction, the support assembly to switch between the first state and the second state.

According to a third aspect, an embodiment of the present disclosure provides an electronic device control method applied to the electronic device provided in the first aspect. The method includes:
  receiving a screen adjustment operation by a user; and
  controlling, in response to the screen adjustment operation, the support assembly to switch between the first state and the second state.

According to a fourth aspect, an embodiment of the present disclosure provides an electronic device, where the electronic device is the electronic device provided in the first aspect. The electronic device includes:
  a first receiving module, configured to receive a screen adjustment instruction; and
  a first control module, configured to control, according to the screen adjustment instruction, the support assembly to switch between the first state and the second state.

According to a fifth aspect, an embodiment of the present disclosure provides an electronic device, where the electronic device is the electronic device provided in the first aspect. The electronic device includes:
  a second receiving module, configured to receive a screen adjustment operation by a user; and
  a second control module, configured to control, in response to the screen adjustment operation, the support assembly to switch between the first state and the second state.

In the embodiments of the present disclosure, the support assembly is disposed on the back side of the flexible screen portion and supports the flexible screen portion. In the case that the support assembly is in the first state, the flexible screen portion is curved; and in the case that the support assembly is in the second state, the flexible screen portion is flat. In this way, the state of the support assembly is switchable according to specific use requirements for the electronic device so as to adjust the screen state of the flexible screen portion, which facilitates fulfillment of use requirements of different use environments and different user groups, and avoids inconvenience of viewing the displayed content, reflection of light on a curved surface, function mistouch, and inconvenient function triggering which are problems with a single-state curved surface structure.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art can still derive other drawings from these accompanying drawings without creative efforts.

DESCRIPTION OF EMBODIMENTS

To make clearer the technical problems to be resolved, technical solutions, and advantages of the present disclosure, the following provides descriptions in detail with reference to the accompanying drawings and specific embodiments.

Referring to FIG. 1 to FIG. 6, an embodiment of the present disclosure provides an electronic device that may include a screen 100 and a support assembly 200.

The screen 100 includes a bendable flexible screen portion 110; and the support assembly 200 is disposed on a back side of the flexible screen portion 110 and configured to support the flexible screen portion 110, and the support assembly 200 is switchable between a first state and a second state.

Figure 1:
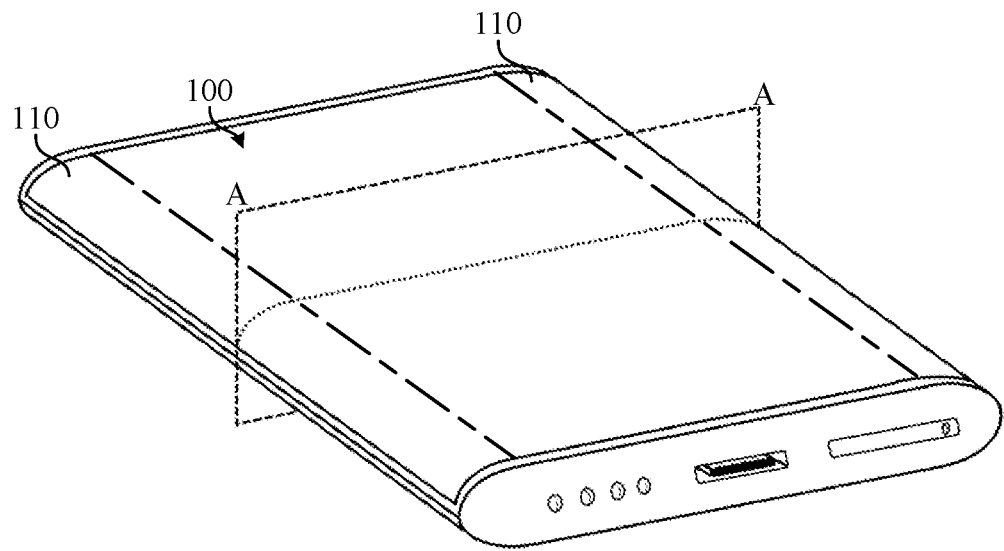
FIG. 1 is a schematic structural diagram of an electronic device with a support assembly being in a first state according to an embodiment of the present disclosure.
Figure 2:
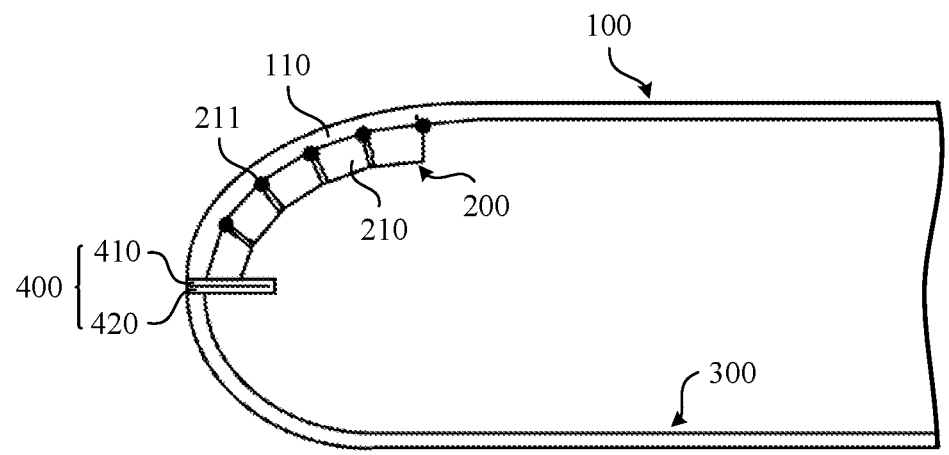
FIG. 2 is a schematic diagram of a partial section of an A-A cross-section of the electronic device shown in FIG. 1.
Figure 4:
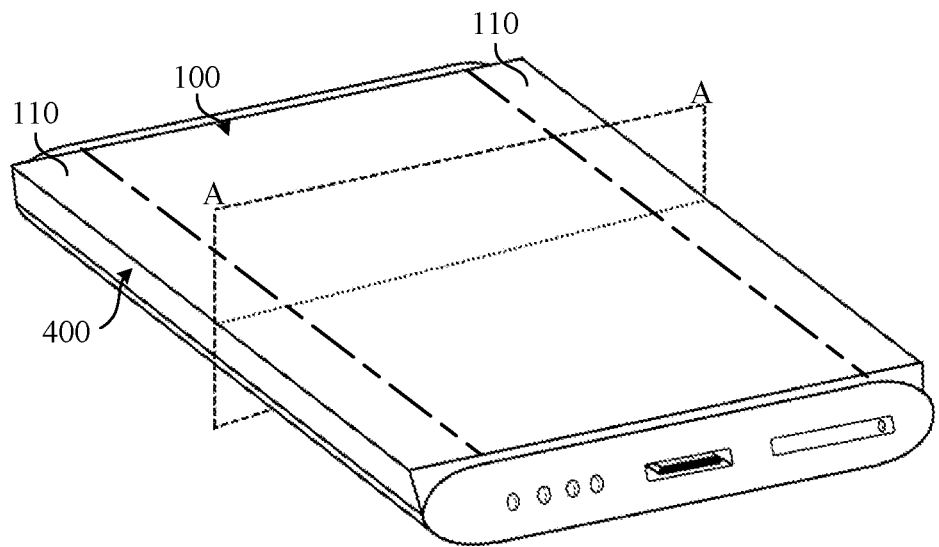
FIG. 4 is a schematic structural diagram of an electronic device with a support assembly being in a second state according to an embodiment of the present disclosure.
Figure 5:
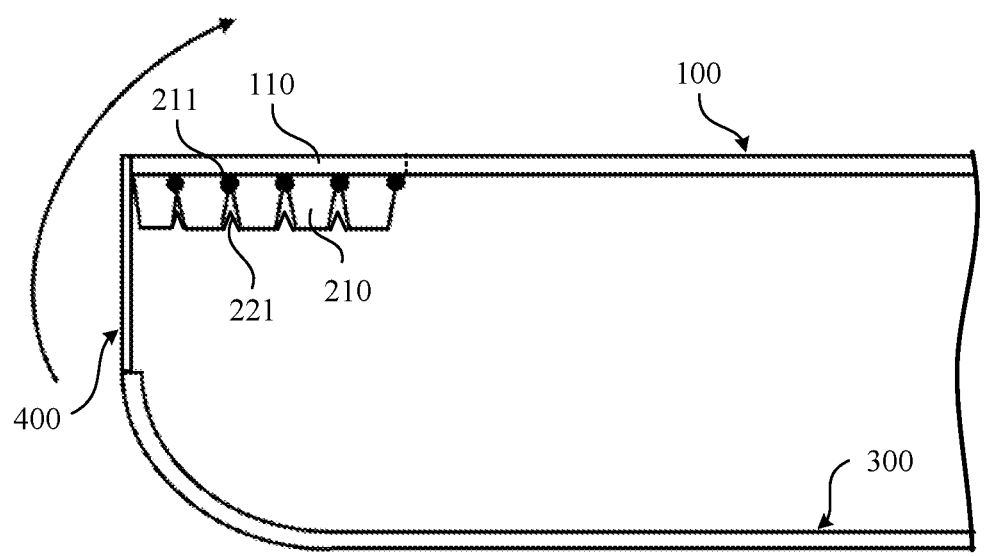
FIG. 5 is a schematic diagram of a partial section of an A-A cross-section of the electronic device shown in FIG. 4.
Figure 6:
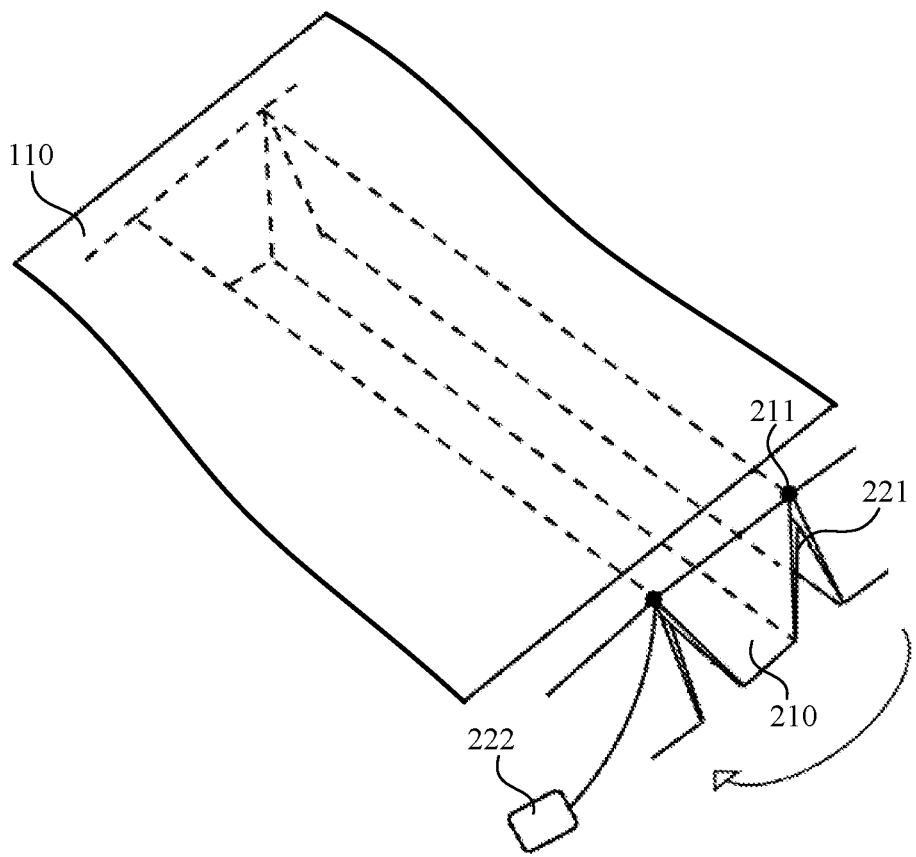
FIG. 6 is a partial schematic diagram of a support assembly being in a second state according to an embodiment of the present disclosure.

As shown in FIG. 1 and FIG. 2, the flexible screen portion 110 is curved in a case that the support assembly 200 is in the first state; and as shown in FIG. 4 and FIG. 5, the flexible screen portion 110 is flat in a case that the support assembly 200 is in the second state.

In the embodiments of the present disclosure, the flexible screen portion 110 is supported by the support assembly 200, and according to the change of the support assembly 200 between the first state and the second state, the flexible screen portion 110 can be switched to present a curved screen or a flat screen. In this way, the screen state of the flexible screen portion 110 can be adjusted by switching the state of the support assembly 200. In the case that the support assembly 200 is in the second state, the flexible screen portion 110 can be set flush (as shown in FIG. 4 and FIG. 5) or tilted with respect to the rest of the screen to which the flexible screen portion 110 is joined. With the support assembly 200 being in the second state to make the flexible screen portion 110 flat, it is convenient for the user to view content displayed on that portion. In addition, the flat flexible screen portion 110 facilitates triggering of functions by the user, avoiding function mistouch or inconvenience of triggering. In the embodiments of the present disclosure, the flexible screen portion 110 may be curved with a predetermined curvature. For example, the predetermined curvature may be the Gaussian curvature.

It can be understood that, when the flexible screen portion 110 is unfolded to present a flat surface in the case that the flexible screen portion 110 is flat, due to its own stiffness and the support provided by the support assembly 200 for the flexible screen portion 110, the flexible screen portion 110 can support and complete tap, touch, and other touch operations, without affecting the use of screen functions.

In the embodiments of the present disclosure, the flexible screen portion 110 may be a structure spliced to the screen 100, or may be a part that is integrally molded with the screen 100. Of the flexible screen portion 110, a side facing the outside of the electronic device and used to display the screen is the front side and a side facing the inside of the electronic device is the back side, where the front side of the flexible screen portion 110 and the back side of the flexible screen portion 110 face opposite directions.

In the embodiments of the present disclosure, the support assembly 200 is disposed on the back side of the flexible screen portion 110 and supports the flexible screen portion 110. In the case that the support assembly 200 is in the first state, the flexible screen portion 110 is curved; and in the case that the support assembly 200 is in the second state, the flexible screen portion 110 is flat. In this way, the state of the support assembly 200 is switchable according to specific use requirements for the electronic device so as to adjust the screen state of the flexible screen portion 110, which facilitates fulfillment of use requirements of different use environments and different user groups.

In the embodiments of the present disclosure, based on different screen design requirements and use requirements, in the case that the support assembly 200 is in the first state, the curved surface of the flexible screen portion 110 may be in different shapes, presenting different arcs in its cross-section. For example, in some optional embodiments of the present disclosure, the flexible screen portion 110 is located at an edge of the screen, and in a case that the support assembly 200 is in the first state, the cross-section of the flexible screen portion 110 may be an arc projecting out from the front side. This helps the flexible screen portion 110 to provide a good grip feel for the user in the case that the support assembly is in the first state. Of course, based on design requirement, in the case that the support assembly 200 is in the first state, the cross-section of the flexible screen portion 110 may alternatively be an arc recessed toward the back side.

Optionally, in some embodiments of the present disclosure, referring to FIG. 2, FIG. 3, FIG. 5, and FIG. 6, the support assembly 200 may include at least two support members 210 and at least one driving structure. Therein, each support member 210 is attached to the back side of the flexible screen portion 110, and two adjacent support members 210 are rotatably connected; and one driving structure is provided between two adjacent support members 210, and the driving structure is configured to drive the two adjacent support members 210 to rotate relative to each other. In the embodiments of the present disclosure, at least two support members 210 are configured to support the flexible screen portion 110, and the driving structure is configured to provide a driving force for the relative rotation of two adjacent support members 210. The driving structure can drive the two adjacent support members 210 connected therewith to rotate relatively approaching each other, and maintain a first included angle between the two adjacent support members 210 to keep the support assembly 200 in the first state; or the driving structure can drive the two adjacent support members 210 connected therewith to rotate relatively leaving each other (in the direction of the arrow shown in FIG. 6), and maintain a second included angle between the two adjacent support members 210 to keep the support assembly 200 in the second state. The first included angle is smaller than the second included angle. The support member 210 may be in a predetermined shape. For example, the support member 210 may be prismatic or wedge-shaped.

In some optional embodiments of the present disclosure, the driving structure may include: an adjusting member 221 and a driving member 222, where the adjusting member 221 is disposed between two adjacent support members 210, and the adjusting member 221 is connected to each of the two adjacent support members 210; and the driving member 222 is connected to the adjusting member 221 to provide power to the adjusting member 221. Herein, the driving member 222 is used to power the adjusting member 221 for the adjusting member 221 to drive the two adjacent support members 210 connected to the adjusting member 221 to rotate relative to each other, so as to drive the two support members 210 to rotate relatively approaching or leaving each other. In the embodiments of the present disclosure, in each driving structure, the adjusting member 221 is disposed along a central axis of relative rotation of the two adjacent support members 210. The adjusting member 221 may be provided in a quantity of at least one. For example, in each driving structure, two such adjusting members 221 may be provided, and the two adjusting members 221 are connected to two ends of the two adjacent support members 210 respectively. For example, in each driving structure, more than two such adjusting members 221 may be provided, and the adjusting members 221 are distributed between the two adjacent support members 210 along the central axis of relative rotation of the two adjacent support members 210. Preferably, these adjusting members 221 may be evenly spaced.

Preferably, in some embodiments of the present disclosure, the adjusting member 221 may be a shape memory material member. The shape memory material member is a component prepared by using a shape memory material, and the shape memory material member has a shape memory effect, able to change to different shapes in response to a variable temperature. The driving member 222 may be a circuit board, which is connected to the shape memory material member to power the shape memory material member. In order to facilitate coordinated control of the electronic device, the circuit board is connected to a main board of the electronic device.

Figure 3:
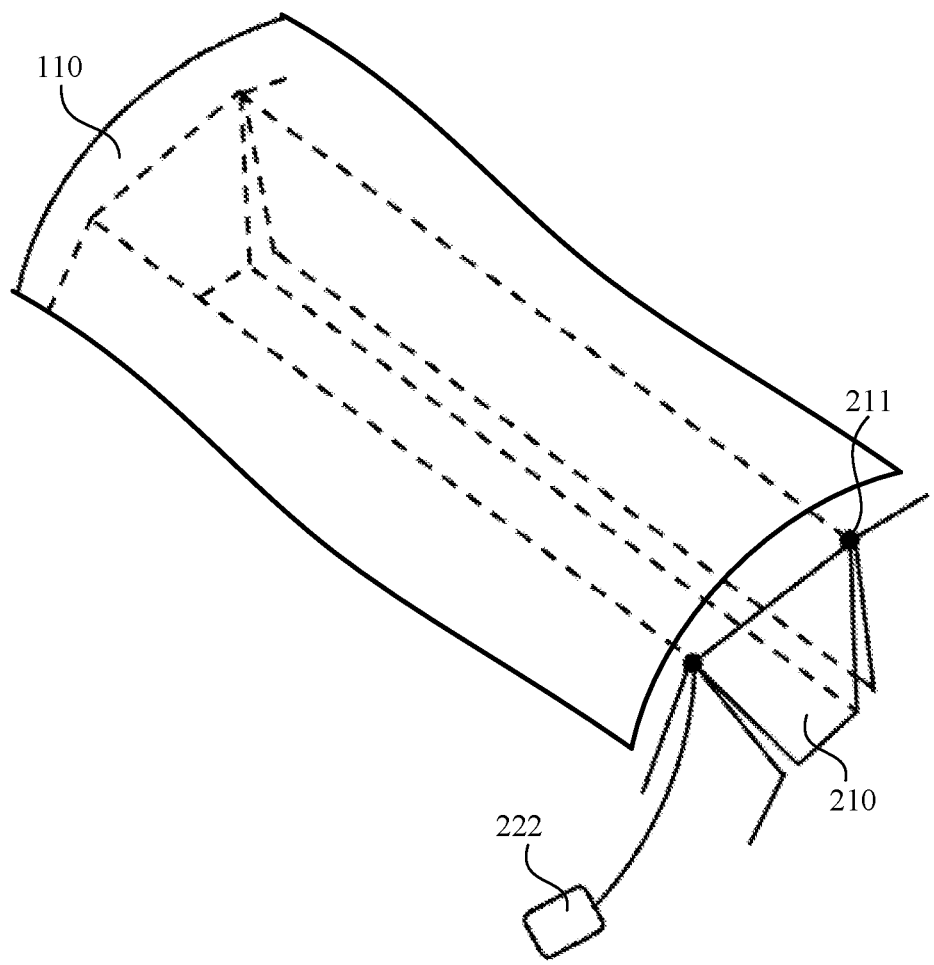
FIG. 3 is a partial schematic diagram of a support assembly being in a first state according to an embodiment of the present disclosure.

As an example, in a case that the circuit board is not powering the shape memory material member, or the circuit board is powering the shape memory material member and providing a first supply current, as shown in FIG. 2 and FIG. 3 (the adjusting member 221 structure is not specifically shown in FIG. 2 or FIG. 3), the shape memory material member presents a "V" shape with a first angle, and two portions of the shape memory material member that form the "V" shape are connected to opposite lateral sides of the two adjacent support members 210, so that the flexible screen portion 110 is curved. In a case that the circuit board is powering the shape memory material member and providing a second supply current, with the shape memory material member being powered, two portions of the shape memory material member that form a "V" shape with a first angle act to open further, driving the two adjacent support members 210 to rotate relative to each other until the shape memory material member presents a "V" shape with a second angle as exemplified in FIG. 5 and FIG. 6, so that the flexible screen portion 110 is flat. Herein, the second angle is greater than the first angle.

The circuit board may be a flexible printed circuit board (FPC). The shape memory material member may be a component prepared using at least one of shape memory alloys (SMA) and shape memory polymers (SMP).

Further, in some optional embodiments of the present disclosure, the adjusting member 221 may include at least one of a resilient member, a solenoid mechanism, and a support rod. Herein, the at least one of a resilient member, a solenoid mechanism, and a support rod may be used as a substitution or supplement for the above use of a shape memory material member as the adjusting member.

In some optional embodiments of the present disclosure, in order to facilitate rotatable connection between the two adjacent support members 210, the two adjacent support members 210 may be connected to each other by a rotating shaft 211.

Optionally, in some embodiments of the present disclosure, referring to FIG. 2 and FIG. 5, the flexible screen portion 110 is connected to a back connector 300, and the back connector 300 may be a cover plate or a back screen. Herein, the back connector 300 may be disposed back-to-back with the screen 100 to provide support and placement support for the electronic device when a user is using the electronic device, and to provide protection for internal elements of the electronic device. It can be understood that, if the back connector 300 is a back screen, the back screen may have the same structure as or a different structure than the screen 100 described above.

Optionally, in some embodiments of the present disclosure, referring to FIG. 2, FIG. 4, and FIG. 5, the electronic device may further include a folding member 400, where the folding member 400 is connected between the flexible screen portion 110 and the back connector 300. In the case that the support assembly 200 is in the first state, the folding member 400 is folded inward to make the flexible screen portion 110 curved, which facilitates a good grip feel for the user and enhances the aesthetic perception; and in the case that the support assembly 200 is in the second state, the folding member 400 is unfolded to make the flexible screen portion 110 flat, which provides structural support for the flexible screen portion 110 through the structural rigidity of the folding member 400. As an example, in a case that the support assembly 200 is switched from the first state to the second state, the folding member 400 is unfolded from the state shown in FIG. 2 in a direction of the arrow shown in FIG. 5.

Preferably, in some embodiments of the present disclosure, in order to facilitate structural integration of the electronic device, and to provide dust protection for the internal elements of the electronic device, the folding member 400 may include at least two folding pages. The at least two folding pages may include a first folding page 410 and a second folding page 420. To be specific, as shown in FIG. 2, the folding member 400 may include: a first folding page 410 and a second folding page 420, where one end of the first folding page 410 is flexibly connected to an edge of the flexible screen portion 110; and one end of the second folding page 420 is rotatably connected to the other end of the first folding page 410, and the other end of the second folding page 420 is flexibly connected to an edge of the back connector 300. Herein, that one end of the first folding page 410 is flexibly connected to an edge of the flexible screen portion 110 means that one end of the first folding page 410 is deformably connected to at least one of the edges of the flexible screen portion 110, facilitating the integral combination of the one end of the first folding page 410 and the edge of the flexible screen portion 110, and enhancing the user's grip feel and aesthetic perception. Similarly, that one end of the second folding page 420 is flexibly connected to an edge of the back connector 300 means that one end of the second folding page 420 is deformably connected to at least one of the edges of the back connector 300, facilitating the integral combination of the one end of the second folding page 420 and the edge of the back connector 300, and enhancing the user's grip feel and aesthetic perception.

In addition, in some optional embodiments of the present disclosure, the electronic device may further include: a touch button, where the touch button is provided in the folding member. A portion of the touch button may be built in or protrude from the folding member 400. As such, in the case that the support assembly 200 is in the first state, the folding member 400 is folded inward, and the touch button is hidden; and in the case that the support assembly 200 is in the second state, the folding member 400 is unfolded, and the touch button is in a touchable state or exposed outside the electronic device, which allowing the user to operate the button when the screen state of the flexible screen portion 110 is flat. Herein, the touch button may be provided in a variety of forms. For example, the touch button may be a physical button, such as a mechanical button or an electronic button; or for example, the touch button may be a touch button, such as a resistive touch button or a capacitive induction button.

In addition, in the embodiments of the present disclosure, the flexible screen portion 110 may be provided in plurality, with each of the flexible screen portions 110 located at an edge of the screen 100, and each of the flexible screen portions 110 supported by one support assembly 200. For example, as shown in FIG. 1 and FIG. 4, two such flexible screen portions 110 may be provided, located on two opposite edges of the screen 100. For another example, four such flexible screen portions 110 may be provided, located at four edges of the screen 100 respectively.

In addition, in the embodiments of the present disclosure, the electronic device may be a mobile phone or a tablet computer. It can be understood that the electronic device is not limited to smart phones or tablet computers, but may alternatively be other electronic devices with a screen display function such as a laptop computer or a personal digital assistant (PDA).

The electronic device provided in the embodiments of the present disclosure is able to switch the state of the support assembly according to specific use requirements for the electronic device, so as to adjust the screen state of the flexible screen portion, which facilitates fulfillment of use requirements of different use environments and different user groups, and avoids inconvenience of viewing the displayed content, reflection of light on a curved surface, function mistouch, and inconvenient function triggering which are problems with a single-state curved surface structure.

Figure 7:
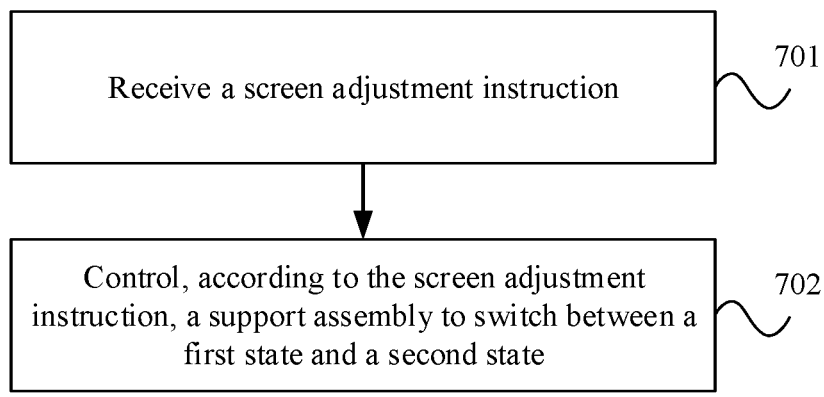
FIG. 7 is a first schematic flowchart of an electronic device control method according to an embodiment of the present disclosure.

Refer to FIG. 7, which is a first schematic flowchart of an electronic device control method according to an embodiment of the present disclosure. This embodiment of the present disclosure provides an electronic device control method applied to the foregoing electronic device. The method may include the following steps:

Step 701: Receive a screen adjustment instruction.
Step 702: Control, according to the screen adjustment instruction, the support assembly to switch between the first state and the second state.

In this embodiment of the present disclosure, the electronic device monitors for and receives screen adjustment instructions for adjusting the screen. With a screen adjustment instruction received, according to the screen adjustment instruction, the electronic device controls the state of the support assembly to switch from the first state to the second state or from the second state to the first state so as to adjust the screen state of the flexible screen portion of the screen, changing the flexible screen portion from a curved screen state to a flat screen state, or from a flat screen state to a curved screen state. In this way, the screen state of the flexible screen portion can be adjusted according to specific use scenarios of the electronic device, which facilitates fulfillment of use requirements of different use scenarios, and avoids inconvenience of viewing the displayed content, reflection of light on a curved surface, function mistouch, and inconvenient function triggering which are problems with a single-state curved surface structure.

Optionally, in some embodiments of the present disclosure, the step 702 of controlling, according to the screen adjustment instruction, the support assembly to switch between the first state and the second state may include the following steps: comparing the screen adjustment instruction with preset adjustment instructions; and in a case that the screen adjustment instruction matches a first preset adjustment instruction, controlling the support assembly to switch from the first state to the second state; or in a case that the screen adjustment instruction matches a second preset adjustment instruction, controlling the support assembly to switch from the second state to the first state; where the first preset adjustment instruction is used to switch the support assembly from the first state to the second state, and the second preset adjustment instruction is used to switch the support assembly from the second state to the first state. In the embodiments of the present disclosure, preset adjustment instructions for controlling switching of the support assembly are defined, and the preset predetermined adjustment instructions include a first preset adjustment instruction and a second preset adjustment instruction, where, after the electronic device receives a screen adjustment instruction, the screen adjustment instruction is compared with the preset adjustment instructions to determine corresponding switching control for the support assembly, which facilitates accurate control.

Optionally, in the embodiments of the present disclosure, whether a screen adjustment instruction is received or not is determined based on use state of the screen. For example, in a case that the display mode of the screen is detected as full screen display, or the screen is currently displayed as a preset game scene, determination is made that a screen adjustment instruction is received, where the screen adjustment instruction matches the first preset adjustment instruction; and in a case that the display mode of the screen is detected as exiting from full screen display, or the screen exits from a preset game scene, determination is made that a screen adjustment instruction is received, where the screen adjustment instruction matches the second preset adjustment instruction. Of course, in the embodiments of the present disclosure, alternatively, the corresponding screen adjustment instruction may be received based on user input operation. For example, in a case that a first input performed by a user on the flexible screen portion is received, the electronic device may determine that a screen adjustment instruction is received, where the screen adjustment instruction matches the first preset adjustment instruction; and in a case that a second input performed by the user on the flexible screen portion is received, the electronic device may determine that a screen adjustment instruction is received, where the screen adjustment instruction matches the second preset adjustment instruction.

Optionally, in some embodiments of the present disclosure, in order to enhance human-machine interaction experience, the method may further include the following step: providing a preset alert according to the screen adjustment instruction. This helps to enhance personalized use and the fun of use, improving user experience. Herein, the preset alert may include at least one of a vibration alert, a preset sound alert, a preset light alert, and the like. In the embodiments of the present disclosure, after receiving the screen adjustment instruction, the electronic device can provide the preset alert according to the screen adjustment instruction on at least one of these occasions: before start of the state switch, at the end of the state switch, and during the state switch of the support assembly. As an example, the preset alert may include a first dynamic alert and a second dynamic alert, and the electronic device provides the first dynamic alert during the process of controlling the support assembly to switch from the first state to the second state, and provides the second dynamic alert during the process of controlling the support assembly to switch from the second state to the first state, where the first dynamic alert and the second dynamic alert may be different or the same.

According to the electronic device control method provided by this embodiment of the present disclosure, a screen adjustment instruction is received; and the support assembly is controlled according to the screen adjustment instruction to switch between the first state and the second state. In this way, the screen state of the flexible screen portion can be adjusted according to specific use scenarios of the electronic device, which facilitates fulfillment of different use requirements of different use scenarios, and avoids inconvenience of viewing the displayed content, reflection of light on a curved surface, function mistouch, and inconvenient function triggering which are problems with a single-state curved surface structure.

Figure 8:
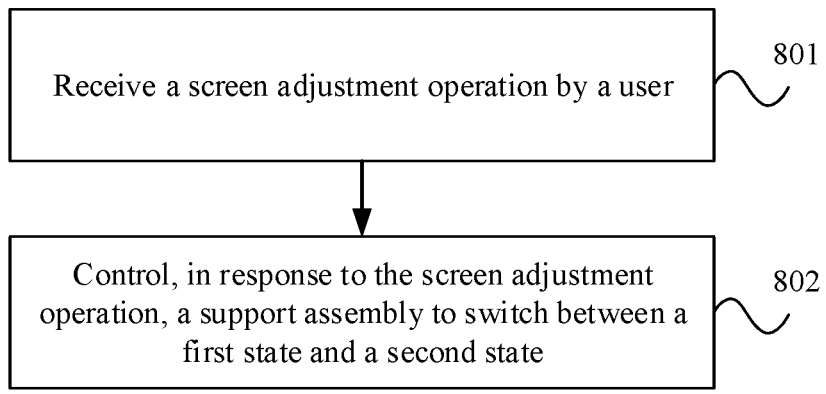
FIG. 8 is a second schematic flowchart of an electronic device control method according to an embodiment of the present disclosure.

Refer to FIG. 8, which is a second schematic flowchart of an electronic device control method according to an embodiment of the present disclosure. This embodiment of the present disclosure provides an electronic device control method applied to the foregoing electronic device. The method may include the following steps:

Step 801: Receive a screen adjustment operation by a user.

Step 802: Control, in response to the screen adjustment operation, the support assembly to switch between the first state and the second state.

The screen adjustment operation may be at least one of a preset voice input operation, a touch input operation acting on the electronic device, a gesture action input operation, and a motion input operation acting on the electronic device. The touch input operation acting on the electronic device herein may include, but is not limited to, a touch input operation acting on the screen or a housing. The gesture action input operation may include, but is not limited to, a hand gesture action input operation, a head action input operation, a face action input operation, and the like. The motion input operation acting on the electronic device may include, but is not limited to, a flinging action input operation, a flipping action input operation, and the like acting on the electronic device.

In this embodiment of the present disclosure, to adjust the flexible screen portion of the screen, a user can perform a screen adjustment operation such that the electronic device receives and responds to the screen adjustment operation to control the state switching of the support assembly, that is, switching from the first state to the second state or from the second state to the first state, so as to adjust the screen state of the flexible screen portion of the screen, changing the flexible screen portion from a curved screen state to a flat screen state or from a flat screen state to a curved screen state. In this way, the screen state of the flexible screen portion can be adjusted according to user's requirements in using the screen, which facilitates fulfillment of different use requirements of different users, and avoids inconvenience of viewing the displayed content, reflection of light on a curved surface, function mistouch, and inconvenient function triggering which are problems with a single-state curved surface structure.

In this embodiment of the present disclosure, a screen adjustment operation for controlling the switch of the support assembly from the first state to the second state, and a screen adjustment operation for controlling the switch of the support assembly from the second state to the first state, may be different operation inputs respectively, so as to facilitate personalized manipulation; or the two operations may be a same operation input, so as to facilitate simplified user manipulation.

By way of example, in some optional embodiments of the present disclosure, the step 802 of controlling, in response to the screen adjustment operation, the support assembly to switch between the first state and the second state may include the following steps: in a case that the flexible screen portion is curved, controlling, in response to the screen adjustment operation, the support assembly to switch from the first state to the second state; and in a case that the flexible screen portion is flat, controlling, in response to the screen adjustment operation, the support assembly to switch from the second state to the first state.

Optionally, in some embodiments of the present disclosure, in order to enhance human-machine interaction experience, the method may further include the following step: providing a preset alert according to the screen adjustment operation. This helps to enhance personalized use and the fun of use, improving user experience. Herein, the preset alert may include at least one of a vibration alert, a preset sound alert, a preset light alert, and the like. In this embodiment of the present disclosure, after receiving the screen adjustment operation, in response to the screen adjustment operation, the electronic device may provide a preset alert on at least one of these occasions: before start of the state switch, at the end of the state switch, and during the state switch of the support assembly. As an example, the preset alert may include a first dynamic alert and a second dynamic alert, and the electronic device provides the first dynamic alert during the process of controlling the support assembly to switch from the first state to the second state, and provides the second dynamic alert during the process of controlling the support assembly to switch from the second state to the first state, where the first dynamic alert and the second dynamic alert may be different or the same.

According to the electronic device control method provided by this embodiment of the present disclosure, a screen adjustment operation by a user is received, and in response to the screen adjustment operation, the support assembly is controlled to switch between the first state and the second state. In this way, the screen state of the flexible screen portion can be adjusted according to user's requirements in using the screen, which facilitates fulfillment of different use requirements of different users, and avoids inconvenience of viewing the displayed content, reflection of light on a curved surface, function mistouch, and inconvenient function triggering which are problems with a single-state curved surface structure.

Based on the above methods applied to electronic devices, the embodiments of the present disclosure provide electronic devices for implementing the above methods.

Figure 9:
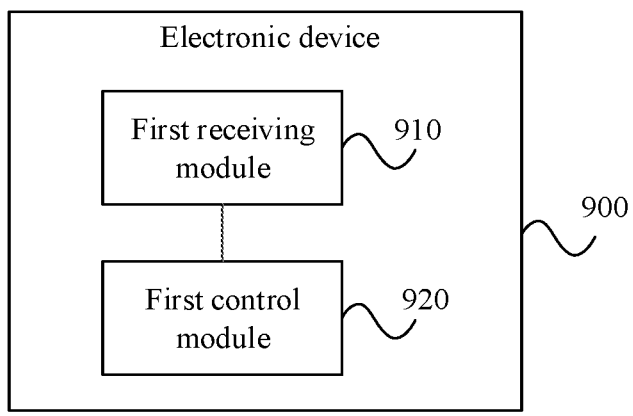
FIG. 9 is a first structural block diagram of an electronic device according to an embodiment of the present disclosure.

Refer to FIG. 9, which is a first block diagram of an electronic device according to an embodiment of the present disclosure. This embodiment of the present disclosure provides an electronic device 900, where the electronic device 900 is the electronic device described above, and the electronic device 900 may include a first receiving module 910 and a first control module 920.

The first receiving module 910 is configured to receive a screen adjustment instruction; and the first control module 920 is configured to control, according to the screen adjustment instruction, the support assembly to switch between the first state and the second state.

Optionally, in some embodiments of the present disclosure, the first control module 920 may include a comparison unit, a first control unit, and a second control unit.

The comparison unit is configured to compare the screen adjustment instruction with preset adjustment instructions.

The first control unit is configured to: in a case that the screen adjustment instruction matches a first preset adjustment instruction, control the support assembly to switch from the first state to the second state.

The second control unit is configured to: in a case that the screen adjustment instruction matches a second preset adjustment instruction, control the support assembly to switch from the second state to the first state.

The first preset adjustment instruction is used to switch the support assembly from the first state to the second state, and the second preset adjustment instruction is used to switch the support assembly from the second state to the first state.

Optionally, in some embodiments of the present disclosure, the electronic device 900 may further include a first alert module.

The first alert module is configured to provide a preset alert according to the screen adjustment instruction.

The preset alert may include at least one of a vibration alert, a preset sound alert, a preset light alert, and the like.

The electronic device provided by this embodiment of the present disclosure is capable of implementing the processes that are implemented by an electronic device in the embodiment of the method applied to an electronic device in FIG. 7. To avoid repetition, details are not repeated herein again.

According to the electronic device provided by the embodiments of the present disclosure, the first receiving module receives a screen adjustment instruction; and according to the screen adjustment instruction, the first control module controls the support assembly to switch between the first state and the second state. In this way, the screen state of the flexible screen portion can be adjusted according to specific use scenarios of the electronic device, which facilitates fulfillment of different use requirements of different use environments, and avoids inconvenience of viewing the displayed content, reflection of light on a curved surface, function mistouch, and inconvenient function triggering which are problems with a single-state curved surface structure.

Figure 10:
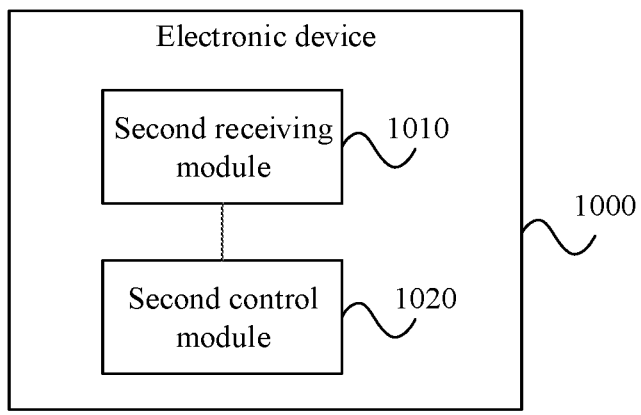
FIG. 10 is a second structural block diagram of an electronic device according to an embodiment of the present disclosure.

Refer to FIG. 10, which is a second block diagram of an electronic device according to an embodiment of the present disclosure. This embodiment of the present disclosure provides an electronic device 1000, where the electronic device 1000 is the electronic device described above, and the electronic device 1000 may include a second receiving module 1010 and a second control module 1020.

The second receiving module 1010 is configured to receive a screen adjustment operation by a user.

The second control module 1020 is configured to control, in response to the screen adjustment operation, the support assembly to switch between the first state and the second state.

Optionally, in some embodiments of the present disclosure, the second control module 1020 may include a fourth control unit and a fifth control unit.

The fourth control unit is configured to: in a case that the flexible screen portion is curved, in response to the screen adjustment operation, control the support assembly to switch from the first state to the second state.

The fifth control unit is configured to: in a case that the flexible screen portion is flat, in response to the screen adjustment operation, control the support assembly to switch from the second state to the first state.

Optionally, in some embodiments of the present disclosure, the electronic device 1000 may further include a second alert module.

The second alert module is configured to provide a preset alert according to the screen adjustment operation.

The preset alert may include at least one of a vibration alert, a preset sound alert, a preset light alert, and the like.

The electronic device provided by this embodiment of the present disclosure is capable of implementing the processes that are implemented by an electronic device in the embodiment of the method applied to an electronic device in FIG. 8. To avoid repetition, details are not repeated herein again.

According to the electronic device provided by the embodiments of the present disclosure, the second receiving module receives a screen adjustment operation by a user, and in response to the screen adjustment operation, the second control module controls the support assembly to switch between the first state and the second state. In this way, the screen state of the flexible screen portion can be adjusted according to user's requirements in using the screen, which facilitates fulfillment of different use requirements of different users, and avoids inconvenience of viewing the displayed content, reflection of light on a curved surface, function mistouch, and inconvenient function triggering which are problems with a single-state curved surface structure.

It can be understood that, in the description of the specification, reference to the term "an embodiment", "one embodiment", or "some embodiments" means that a particular feature, structure, or characteristic associated with the embodiment is included in at least one embodiment or example of the present disclosure. Thus, "in an embodiment", "in one embodiment", and "in some embodiments" appearing throughout the specification do not necessarily refer to the same embodiment. In addition, elements, structures, or features described in one accompanying drawing or one embodiment of the present disclosure can be combined with elements, structures or features illustrated in one or more other accompanying drawings or embodiments in any suitable manner.

It is noted that in one or more embodiments herein, the term "include", "comprise", or any other variation thereof is intended to cover non-exclusive inclusion such that a process, method, article, or apparatus including a set of elements includes not only those elements, but also other elements that are not explicitly listed or elements that are inherent to such process, method, article, or device. Without further limitation, an element defined by the statement "including a . . . " does not preclude the existence of other identical elements in the process, method, article, or apparatus that includes that element.

In the present disclosure, unless otherwise expressly specified or defined, such terms as "mount", "connected", "connect", "fasten", and "dispose" should be understood in their broad senses. For example, they may refer to a fixed connection, or a detachable connection, or an integral piece; may refer to a mechanical connection or an electrical connection; and may refer to a direct connection or an indirect connection via an intermediate medium, and may refer to a connection within two components or an interaction between two components. For a person of ordinary skill in the art, the specific meanings of the above terms in the context of the present disclosure can be understood on as appropriate.

Alternatively, the present disclosure can repeat references to numbers and/or letters in different embodiments or examples. Such repetition is for the purposes of simplicity and clarity, and is not in itself indicative of a relationship between the various embodiments and/or configurations discussed.

Further, in the embodiments of the present disclosure, relational terms, such as first and second, are used only to distinguish one entity or operation from another entity or operation, and do not necessarily require or imply presence of any such actual relationship or order between these entities or operations.

The embodiments of the present disclosure have been described above with reference to the accompanying drawings, but the present disclosure is not limited to these specific embodiments, which are illustrative rather than limitative. Inspired by the present disclosure, a person of ordinary skill in the art can make many variations without departing from the essence of the present disclosure and the scope of protection of the claims. All such variations shall fall within the protection of the present disclosure.

What is claimed is:

1. An electronic device, comprising:
    a screen, wherein the screen comprises a bendable flexible screen portion; and
    a support assembly, wherein the support assembly is disposed on a back side of the flexible screen portion and configured to support the flexible screen portion, and the support assembly is switchable between a first state and a second state; wherein
    in a case that the support assembly is in the first state, the flexible screen portion is curved; and
    in a case that the support assembly is in the second state, the flexible screen portion is flat;
    wherein the flexible screen portion is connected to a back connector, and the back connector is a cover plate or a back screen;
    wherein the electronic device further comprises:
    a folding member, wherein the folding member is connected between the flexible screen portion and the back connector; wherein
    in a case that the support assembly is in the first state, the folding member is folded inward, so that the flexible screen portion is curved; and
    in a case that the support assembly is in the second state, the folding member is unfolded, so that the flexible screen portion is flat.

2. The electronic device according to claim 1, wherein the flexible screen portion is located at an edge of the screen, and in a case that the support assembly is in the first state, a cross-section of the flexible screen portion is an arc projecting out from a front side.

3. The electronic device according to claim 1, wherein the support assembly comprises:
    at least two support members, wherein each of the support members is attached to a back side of the flexible screen portion, and two adjacent support members are rotatably connected; and
    driving structure(s), wherein one driving structure is provided between two adjacent support members, and the driving structure is configured to drive two adjacent support members to rotate relative to each other.

4. The electronic device according to claim 3, wherein the driving structure comprises:
    an adjusting member, wherein the adjusting member is disposed between two adjacent support members, and the adjusting member is connected to each of the two adjacent support members; and
    a driving member, wherein the driving member is connected to the adjusting member and configured to power the adjusting member.

5. The electronic device according to claim 4, wherein the adjusting member is a shape memory material member.

6. The electronic device according to claim 3, wherein two adjacent support members are connected to each other by a rotating shaft.

7. The electronic device according to claim 1, wherein the folding member comprises:
    a first folding page, wherein one end of the first folding page is flexibly connected to an edge of the flexible screen portion; and
    a second folding page, wherein one end of the second folding page is rotatably connected to the other end of the first folding page, and the other end of the second folding page is flexibly connected to an edge of the back connector.

8. The electronic device according to claim 1, wherein the flexible screen portion is provided in plurality, with each of the flexible screen portions located at an edge of the screen and each of the flexible screen portions supported by one support assembly.

9. An electronic device control method applied to the electronic device according to claim 1, comprising:
    receiving a screen adjustment instruction; and
    controlling, according to the screen adjustment instruction, the support assembly to switch between the first state and the second state.

10. The method according to claim 9, wherein the controlling, according to the screen adjustment instruction, the support assembly to switch between the first state and the second state comprises:
    comparing the screen adjustment instruction with preset adjustment instructions; and
    in a case that the screen adjustment instruction matches a first preset adjustment instruction, controlling the support assembly to switch from the first state to the second state; or
    in a case that the screen adjustment instruction matches a second preset adjustment instruction, controlling the support assembly to switch from the second state to the first state;
    wherein
    the first preset adjustment instruction is used to switch the support assembly from the first state to the second state, and the second preset adjustment instruction is used to switch the support assembly from the second state to the first state.

11. The method according to claim 9, further comprising:
   providing a preset alert according to the screen adjustment instruction.

12. An electronic device control method applied to the electronic device according to claim 1, comprising:
   receiving a screen adjustment operation by a user; and
   controlling, in response to the screen adjustment operation, the support assembly to switch between the first state and the second state.

13. The method according to claim 12, wherein the controlling, in response to the screen adjustment operation, the support assembly to switch between the first state and the second state comprises:
   in a case that the flexible screen portion is curved, controlling, in response to the screen adjustment operation, the support assembly to switch from the first state to the second state; and
   in a case that the flexible screen portion is flat, controlling, in response to the screen adjustment operation, the support assembly to switch from the second state to the first state.

\* \* \* \* \*